United States Patent
Dinh et al.

(10) Patent No.: US 7,577,169 B1
(45) Date of Patent: Aug. 18, 2009

(54) TIME STAMPING

(75) Inventors: Son Dinh, San Diego, CA (US); Keith Church, San Diego, CA (US); Ilya Stevens, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 553 days.

(21) Appl. No.: 11/290,254

(22) Filed: Nov. 30, 2005

(51) Int. Cl.
*H04J 3/06* (2006.01)

(52) U.S. Cl. .................. 370/509; 370/350; 370/516

(58) Field of Classification Search ............ 370/238, 370/350, 503–516; 713/400, 500, 503
See application file for complete search history.

(56) References Cited

U.S. PATENT DOCUMENTS

2003/0142696 A1* 7/2003 Holmeide et al. ........... 370/508
2007/0061607 A1* 3/2007 Carlson et al. ............. 713/503

OTHER PUBLICATIONS

Oyvind Holmeide and Tor Skeie, article titled "Time synchronization in switched Ethernet", available on the Internet on Jun. 11, 2003 at http://www.ontimenet.com, Downloads/Articles section, pp. 1-4, (verified using the Internet Archive WayBack Machine at http://www.archive.org).*

* cited by examiner

*Primary Examiner*—Ricky Ngo
*Assistant Examiner*—Pao Sinkantarakorn
(74) *Attorney, Agent, or Firm*—Kyle Eppele; Peter A. Lipovsky; Allan Y. Lee

(57) ABSTRACT

A method of time stamping by using a modified NTP at the data link/physical layers. The method includes steps of time stamping and recording arrival and transmit times at a lower data link level of a requester and/or a responder.

18 Claims, 3 Drawing Sheets

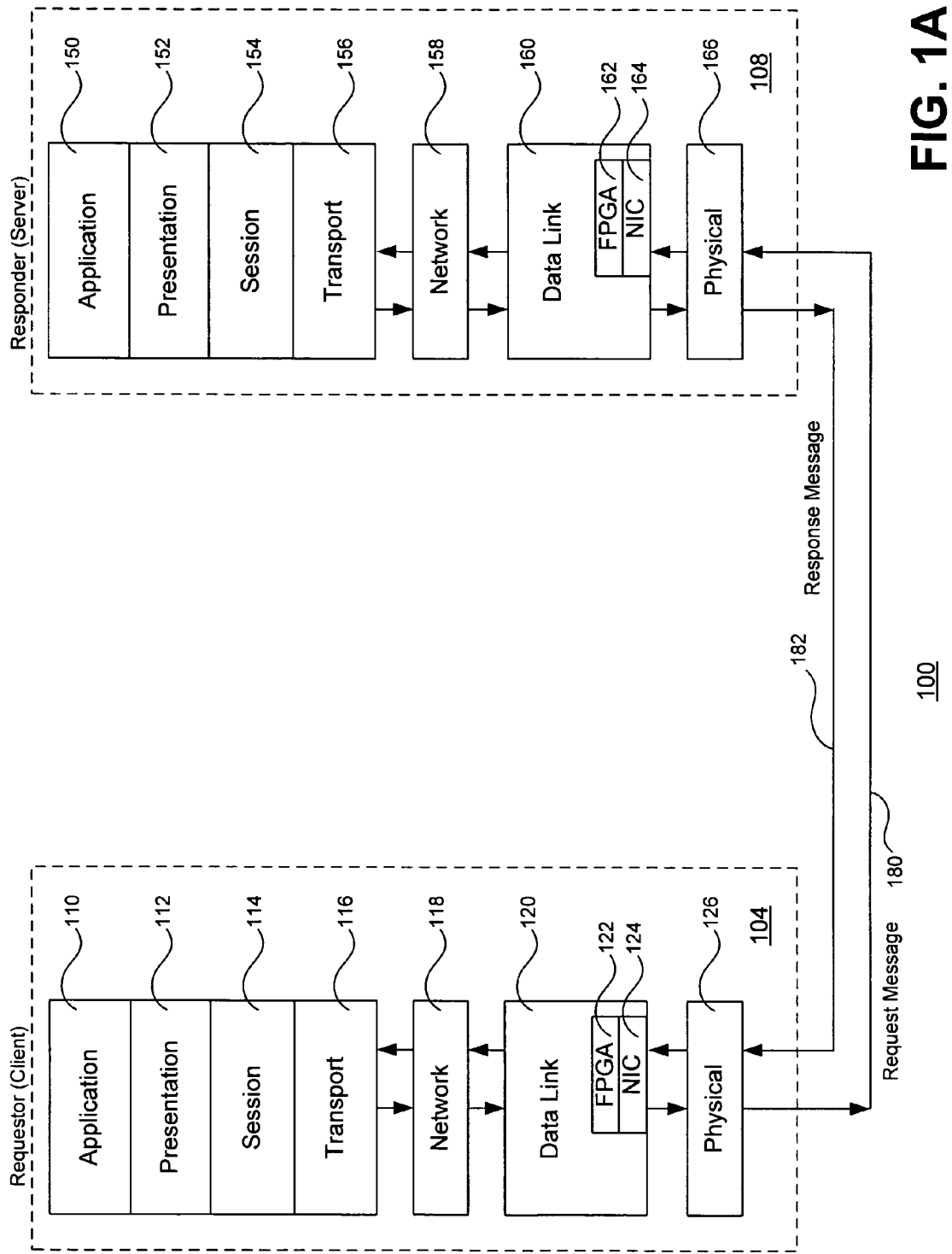

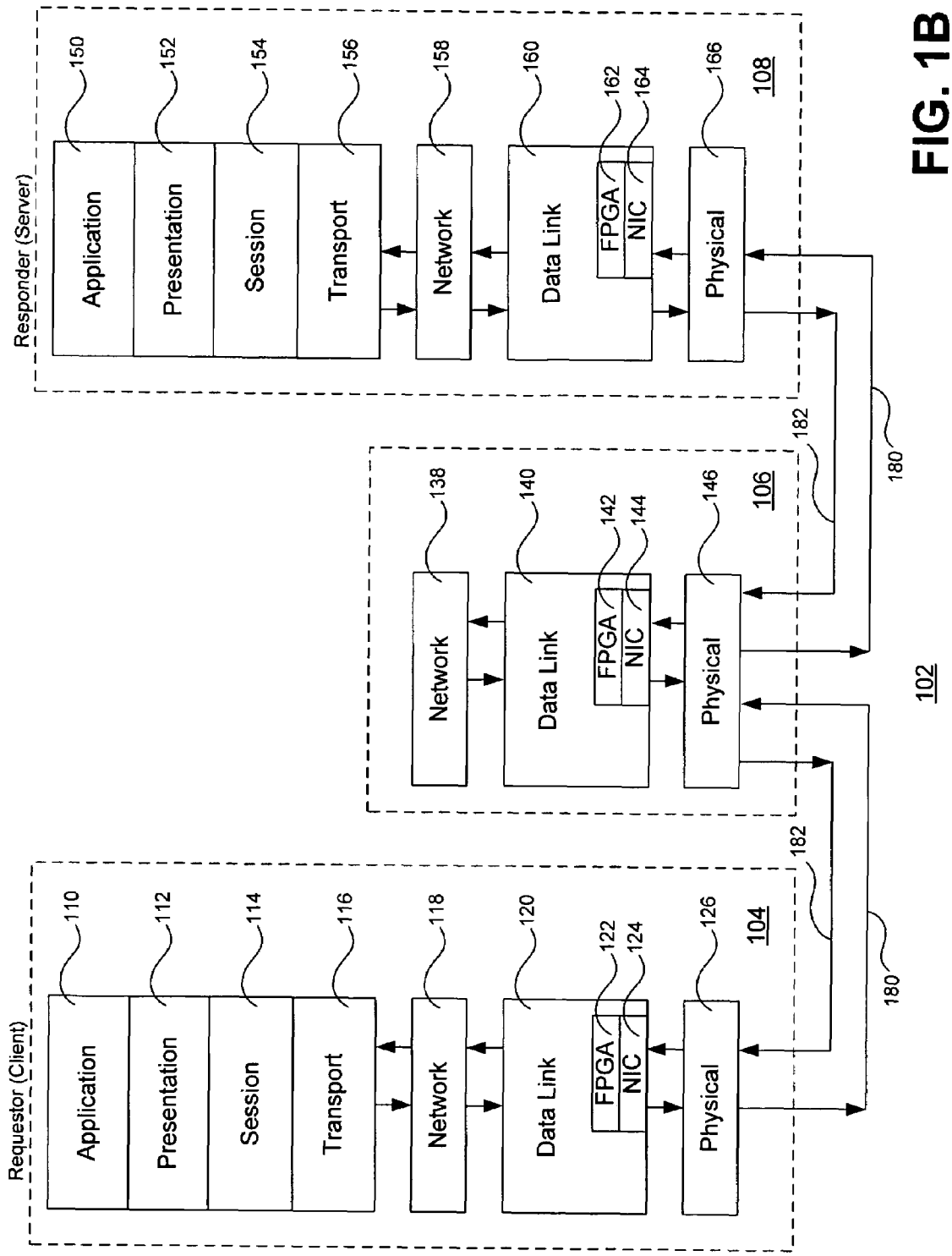

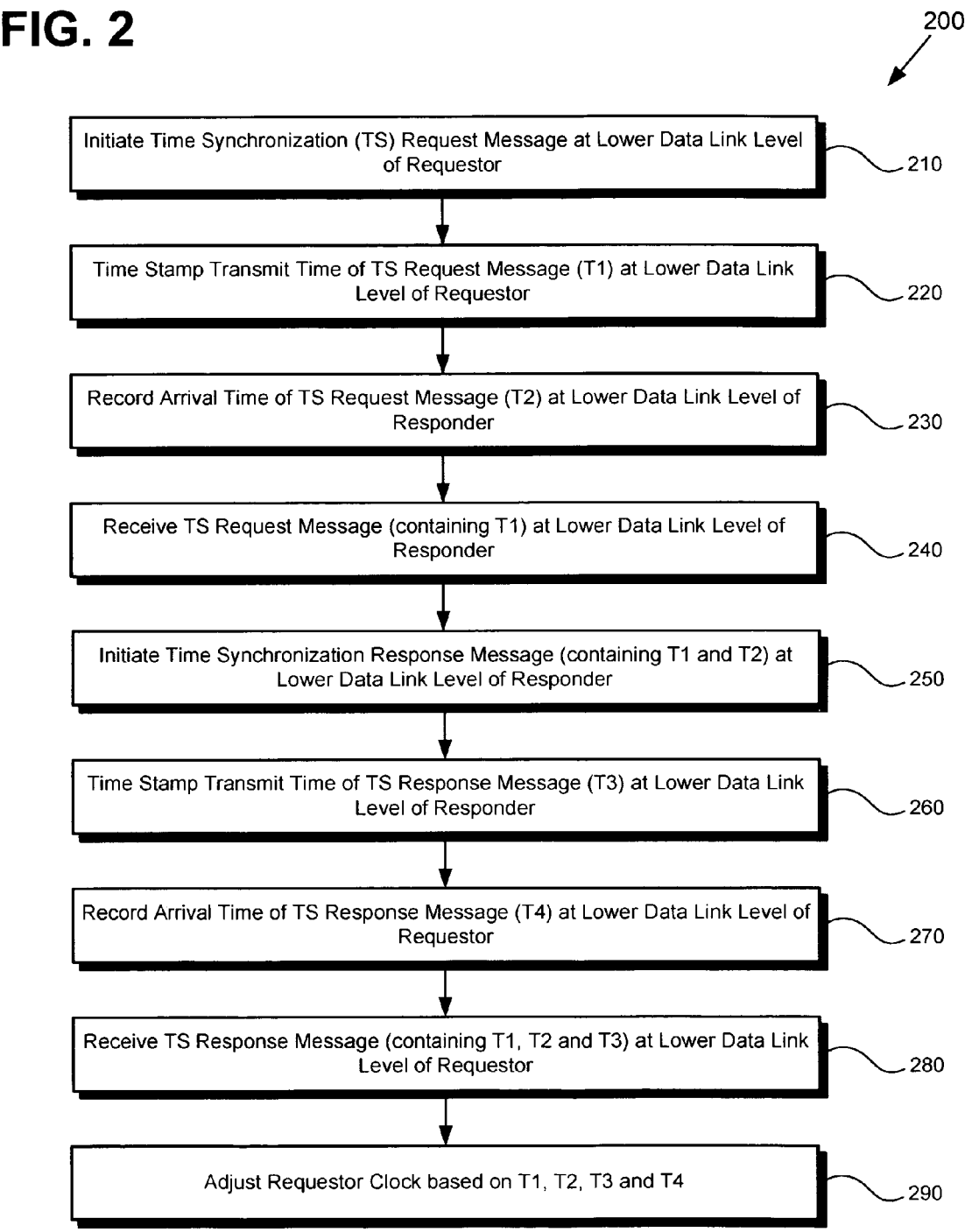

TIME STAMPING

BACKGROUND

The patent application is generally in the field of methods of remote clock synchronization. Systems having remote clients transmit information in an attempt to synchronize clocks.

Typical clock synchronization techniques perform time stamping at the application layer (e.g., NTP in an OSI model), which introduces errors due to fluctuating time delays in all OSI layers. Such fluctuating time delays typically fluctuate on the order of milliseconds, which produce errors on the order of milliseconds.

A need exists for clock synchronization techniques that reduce or eliminate errors caused by fluctuating time delays in the OSI layers.

BRIEF DESCRIPTION OF THE DRAWINGS

FIG. 1A is a block diagram of one embodiment of a system that can implement an embodiment of time stamping.

FIG. 1B is a block diagram of one embodiment of a system that can implement an embodiment of time stamping.

FIG. 2 is a flowchart of one embodiment of time stamping.

DETAILED DESCRIPTION

Described herein is Time Stamping.

DEFINITIONS

The following definitions and acronyms are used herein:
Acronym(s):
FPGA—Field Programmable Gate Array(s)
NIC—Network Interface Card(s)
NTP—Network Time Protocol
OSI—Open Systems Interconnection
PCI—Peripheral Component Interconnect

DEFINITION(S)

Medium—a transmission intermediary

The method of time stamping transfers a time reference from a first user in a first area to a second user in a second area by time stamping at the lower data link/physical layers, which does not introduce errors caused by fluctuating time delays of higher layers (e.g., network and application layers). Thus, the method of time stamping accrues errors caused by fluctuating time delays from the lower data link/physical layers, which typically have relatively minor time fluctuations on the order of nanoseconds.

FIG. 1A is a block diagram of one embodiment of a system that can implement an embodiment of time stamping. The time stamping method is described in detail below in relation to flowchart 200 of FIG. 2. As shown in FIG. 1A, OSI system 100 includes requestor 104, responder 108 and mediums 180, 182. Requestor 104 and responder 108 communicate via mediums 180, 182. Requester 104 can comprise a client computer. Responder 108 can comprise a server computer. Mediums 180, 182 comprise any means of transmitting and receiving digital data such as standard cable, optical fiber conductor and air.

As shown in FIG. 1A, requester 104 includes application layer 110, presentation layer 112, session layer 114, transport layer 116, network layer 118, data link layer 120 and physical layer 126. These OSI model layers (layers 110-126) are well known in the art, and thus, are not described in detail herein. Data link layer 120 includes a lower data link layer and an upper data link layer, wherein the lower data link layer directly interfaces with physical layer 126. The lower data link layer includes field programmable gate array (FPGA) 122 and network interface card (NIC) 124. Physical layer 126 transmits and receives messages in bit format (e.g., 1011) over mediums 180, Data link layer 120 transmits and receives information from physical layer 126 and organizes the bit format into frames. FPGA 122 and NIC 124 of the lower data link layer are capable of time stamping messages. In one embodiment, FPGA 122 time stamps messages. In one embodiment, NIC 124 time stamps messages. Network layer 118 transmits and receives frames from data link layer 120 and converts messages into packets. Network layer 118 provides routing information to route packets through a network. Transport layer 116 receives packets from network layer 114 Transport layer 116 decomposes and recomposes packets with error checks for transportation across networks. Session layer 114 manages connections between computers (e.g., between requestor 104 and responder 108). Presentation layer 112 translates messages between formats for transportation across networks. Application layer 110 provides services to support user applications.

Responder 108 is substantially similar to requester 104, and thus, similar components are not described hereinagain. Responder 108 includes application layer 150, presentation layer 152, session layer 154, transport layer 156, network layer 158, data link layer 160 and physical layer 166. Data link layer 160 includes a lower data link layer and an upper data link layer, wherein the lower data link layer directly interfaces with physical layer 166. The lower data link layer includes FPGA 162 and NIC 164.

FIG. 1B is a block diagram of one embodiment of a system that can implement an embodiment of time stamping. As shown in FIG. 1B, OSI system 102 includes requester 104, network node 106, responder 108 and mediums 180, 182. Requestor 104 and responder 108 communicate via mediums 180, 182 and network node 106. Requester 104 can comprise a client computer. Responder 108 can comprise a server computer. FIG. 1B is substantially similar to FIG. 1A, and thus, similar components are not described hereinagain. As shown in FIG. 1B, network node 106 includes network layer 138, data link layer 140 and physical layer 146. Data link layer 140 includes a lower data link layer and an upper data link layer, wherein the lower data link layer directly interfaces with physical layer 146. The lower data link layer includes FPGA 142 and NIC 144. Network node 106 is capable of communicating with requester 104 and responder 108 via mediums 180, 182.

FIG. 2 is a flowchart of one embodiment of a method of time stamping. Certain details and features have been left out of flowchart 200 of FIG. 2 that are apparent to a person of ordinary skill in the art. For example, a step may consist of one or more sub-steps or may involve specialized equipment or materials, as known in the art. While STEPS 210 through 290 shown in flowchart 200 are sufficient to describe one embodiment, other embodiments may utilize steps different from those shown in flowchart 200.

Referring to FIG. 2, at STEP 210 in flowchart 200, the method initiates a time synchronization (TS) request message at a lower data link level of a requester. In one embodiment, the method initiates a TS request message at the NIC level of the lower data link level of the requestor. After STEP 210, the method proceeds to STEP 220.

Referring to FIG. 2, at STEP 220 in flowchart 200, the method time stamps the transmit time (i.e., the time at which transmission is initiated) of the TS request message (T1) at a lower data link level of the requestor. In one embodiment, the method time stamps the TS request message at the FPGA level of the lower data link level of the requester. After STEP 220, the method proceeds to STEP 230.

Referring to FIG. 2, at STEP 230 in flowchart 200, the method records the arrival time of the TS request message (T2) at a lower data link level of a responder. In one embodiment, the method records the arrival time of the TS request message at the FPGA level of the lower data link level of the responder. After STEP 230, the method proceeds to STEP 240.

Referring to FIG. 2, at STEP 240 in flowchart 200, the method receives the TS request message (containing T1) at the lower data link level of the responder. In one embodiment, the method receives the TS request message at the FPGA level of the lower data link level of the responder. After STEP 240, the method proceeds to STEP 250.

Referring to FIG. 2, at STEP 250 in flowchart 200, the method initiates a time synchronization response message at the lower data link level of the responder. In one embodiment, the TS response message includes T1 and T2. In one embodiment, the method initiates a TS response message at the FPGA level of the lower data link level of the responder. After STEP 250, the method proceeds to STEP 260.

Referring to FIG. 2, at STEP 260 in flowchart 200, the method time stamps the transmit time of the TS response message (T3) at the lower data link level of the responder and includes the transmit time of the TS response message in the message being sent. Thus, the message being sent comprises T1, T2 and T3. In one embodiment, the method time stamps the TS request message at the FPGA level of the lower data link level of the responder. After STEP 260, the method proceeds to STEP 270.

Referring to FIG. 2, at STEP 270 in flowchart 200, the method records the arrival time of the TS response message (T4) at the lower data link level of the requester. In one embodiment, the method records the arrival time of the TS response message at the FPGA level of the lower data link level of the requestor. After STEP 270, the method proceeds to STEP 280.

Referring to FIG. 2, at STEP 280 in flowchart 200, the method receives the TS response message at the lower data link level of the requestor. In one embodiment, the TS response message includes T1, T2 and T3. In one embodiment, the method receives the TS response message at the FPGA level of the lower data link level of the requester. After STEP 280, the method proceeds to STEP 290.

Referring to FIG. 2, at STEP 290 in flowchart 200, the method adjusts the requester clock based on T1, T2, T3 and T4. In one embodiment, the method adjusts the requester clock using a clock offset and path delay. In one embodiment, the clock offset and path delay are determined according to the following Equations 1 and 2:

$$\text{path delay} = [(T2-T1)-(T3-T4)]/2 \quad \text{(Equation 1)}$$

$$\text{clock offset} = [(T2-T1)+(T3-T4)]/2 \quad \text{(Equation 2)}$$

where,

T1 represents transmit time (time at which transmission is initiated) of TS request message
T2 represents arrival time of TS request message
T3 represents transmit time of TS response message
T4 represents arrival time of TS response message In one embodiment, the method adjusts the requester clock using the following method. Assuming transmit and return paths are approximately reciprocal, path time delay for the transmit leg is approximately equal to the received leg of the path. Thus, values for path delay and clock offset can be determined using Equations 1 and 2 and substituting for the known quantities of T1, T2, T3 and T4. Using the path delay and clock offset, delays can be compensated and calculated true clock time can be determined. The method adjusts the local (node) clock based on the calculated true clock time. After STEP 290, the method terminates.

An exemplary implementation of one embodiment of the time stamping method is described in detail below in relation to FIG. 1A and flowchart 200 of FIG. 2. Referring to FIGS. 1A and 2, at STEP 210 in flowchart 200, the method initiates a TS request message at NIC 124 of requestor 104. After STEP 210, the method proceeds to STEP 220. Referring to FIGS. 1A and 2, at STEP 220 in flowchart 200, the method time stamps the transmit time of the TS request message (T1) at FPGA 122 of requestor 104. After STEP 220, the method proceeds to STEP 230.

Referring to FIGS. 1A and 2, at STEP 230 in flowchart 200, the method records the arrival time of the TS request message (T2) at FPGA 162 of responder 108. After STEP 230, the method proceeds to STEP 240. Referring to FIGS. 1A and 2, at STEP 240 in flowchart 200, the method receives the TS request message (containing T1) at FPGA 162 of responder 108. After STEP 240, the method proceeds to STEP 250.

Referring to FIGS. 1A and 2, at STEP 250 in flowchart 200, the method initiates a time synchronization response message (containing T2) at NIC 164 of responder 108. After STEP 250, the method proceeds to STEP 260. Referring to FIGS. 1A and 2, at STEP 260 in flowchart 200, the method time stamps the transmit time of the TS response message (T3) at FPGA 162 of responder 108. After STEP 260, the method proceeds to STEP 270.

Referring to FIGS. 1A and 2, at STEP 270 in flowchart 200, the method records the arrival time of the TS response message (T4) at FPGA 122 of requester 104. After STEP 270, the method proceeds to STEP 280. Referring to FIGS. 1A and 2, at STEP 280 in flowchart 200, the method receives the TS response message (containing T1, T2 and T3) at FPGA 122 of requestor 104. After STEP 280, the method proceeds to STEP 290. Referring to FIG. 2, at STEP 290 in flowchart 200, the method adjusts the requester clock based on T1, T2, T3 and T4.

An exemplary implementation of one embodiment of the time stamping method is described below in relation to FIG. 1B. In an intermediate node embodiment of the time stamping method, the method time stamps and records arrival times at the lower data link levels of requestor 104, network node 106 and responder 108. The method uses these time stamps and arrival times to adjust the requester clock.

In one embodiment, the time stamping method time stamps NTP messages at the Physical Layer using firmware/hardware performed by counters, latches, registers and embedded processors implemented on a PCI-abased, fast, stable and multifunctional FPGA module. Further, Vernier interpolation is employed within the FPGA module to achieve fine time resolution, and thus, improve the precision of time and synchronization parameters necessary for clock synchronization.

From the above description, it is manifest that various techniques can be used for implementing the concepts without departing from their scope. Moreover, a person of ordinary skill in the art would recognize that changes can be made in form and detail without departing from the spirit and the scope. The described embodiments are to be considered in all respects as illustrative and not restrictive. It should also be understood that the particular embodiments described herein are capable of many rearrangements, modifications, and substitutions without departing from the scope and spirit.

What is claimed is:

1. A method of time stamping, the method comprising the steps of:
   a. initiating a time stamp request message at a lower data link layer of a requester wherein said data link layer is comprised of hardware which includes embedded processors to enable said data link layer of said requestor to perform Vernier interpolation;
   b. time stamping a transmit time of said time stamp request message at said lower data link level of said requester;
   c. recording an arrival time of said time stamp request message at a said lower data link level of a responder, wherein said data link layer is comprised of hardware which includes embedded processors to enable said data link layer of said requestor to perform Vernier interpolation;
   d. receiving said time stamp request message at said lower data link level of said responder;
   e. initiating a time stamp response message at said lower data link level of said responder;
   f. time stamping a transmit time of said time stamp response message at said lower data link level of said responder;
   g. recording an arrival time of said time stamp response message at said lower data link level of said requestor;
   h. receiving said time stamp response message at said lower data link level of said requestor; and
   i. adjusting a requester clock using a clock offset and path delay determined by equations utilizing the synchronization parameters Time 1 (T1), Time 2 (T2), Time 3 (T3) and Time 4 (T4) which have been calculated selectively using Vernier interpolation as follows:

$$\text{path delay}=[(T2-T1)-(T3-T4)]/2$$

$$\text{clock offset}=[(T2-T1)+(T3-T4)]/2$$

where
   T1 represents transmit time of said time stamp request message
   T2 represents arrival time of said time stamp request message
   T3 represents transmit time of said time stamp response message
   T4 represents arrival time of said time stamp response message.

2. The method of claim 1, wherein said lower data link level of said requestor comprises a Field Programmable Gate Array which further includes embedded processors and a Peripheral Component Interface device to achieve fine time resolution and improve synchronization of parameters.

3. The method of claim 1, wherein said lower data link level of said responder comprises a Field Programmable Gate Array which further includes embedded processors and a Peripheral Component Interface device to achieve fine time resolution and improve synchronization of parameters.

4. The method of claim 1, wherein said lower data link level of said requestor comprises a Network Interface Card which is abased by a Peripheral Component Interconnect device to achieve fine time resolution and improve synchronization of parameters.

5. The method of claim 1, wherein said lower data link level of said responder comprises a Network Interface Card which is abased by a Peripheral Component Interconnect device to achieve fine time resolution and improve synchronization of parameters.

6. The method of claim 1, wherein said receiving said time stamp request message STEP (d) comprises receiving said time stamp request message at said lower data link level of said responder, wherein said time stamp request message includes transmit time of said time stamp request message and wherein said requestor is a client computer and said responder is a server computer.

7. The method of claim 1, wherein said time stamp response message STEP (e) comprises initiating said time stamp response message at said lower data link level of said responder, wherein said time stamp response message includes arrival time of said time stamp request message.

8. The method of claim 1, wherein said initiating said time stamp response message STEP (e) comprises initiating said time stamp response message at said lower data link level of said responder, wherein said time stamp response message includes said transmit time of said time stamp request message and said arrival time of said time stamp request message.

9. The method of claim 1, wherein said receiving said time stamp response message STEP (h) comprises receiving said time stamp response message at said lower data link level of said requester, wherein said time stamp response message includes said arrival time of said time stamp request message and said transmit time of said time stamp response message.

10. The method of claim 1, wherein said receiving said time stamp response message STEP (h) comprises receiving said time stamp response message at said lower data link level of said requester, wherein said time stamp response message includes said transmit time of said time stamp request message, said arrival time of said time stamp request message and said transmit time of said time stamp response message.

11. The method of claim 1, wherein said adjusting STEP (i) comprises adjusting said requester clock using a clock offset and a path delay wherein path time for transmission and path time for receipt are approximately equal.

12. The method of claim 1 which further includes the step of performing Vernier interpolation to improve the precision of said T1, T2, T3 and T4 synchronization parameters.

13. The system claim 1 which further includes the step of performing Vernier interpolation to improve the precision of said T1, T2, T3 and T4 synchronization parameters.

14. A system for high-precision clock synchronization comprising:
   a. means for initiating a time stamp request message at a lower data link level of a requester;
   b. means, operatively coupled and responsive to said means for initiating a time stamp request message at a lower data link level of a requestor, and for time stamping a transmit time of said time stamp request message at said lower data link level of said requestor;
   c. means, operatively coupled and responsive to said means for time stamping a transmit time of said time stamp request message at said lower data link level of said requestor, for recording an arrival time of said time stamp request message at a lower data link level of a responder;
   d. means, operatively coupled and responsive to said means for recording an arrival time of said time stamp request message at a lower data link level of a responder, for receiving said time stamp request message at said lower data link level of said responder;
   e. means, operatively coupled and responsive to said means for receiving said time stamp request message at said lower data link level of said responder, for initiating a time stamp response message at said lower data link level of said responder;

f. means, operatively coupled and responsive to said means for initiating a time stamp response message at said lower data link level of said responder, for time stamping a transmit time of said time stamp response message at said lower data link level of said responder;

g. means, operatively coupled and responsive to said means for time stamping a transmit time of said time stamp response message at said lower data link level of said responder; for recording an arrival time of said time stamp response message at said lower data link level of said requester;

h. means, operatively coupled and responsive to said means for recording an arrival time of said time stamp response message at said lower data link level of said requester, for receiving said time stamp response message at said lower data link level of said requester;

i. means, for adjusting a requestor clock using a clock offset and path delay determined by the following equations utilizing the synchronization parameters Time 1 (T1), Time 2 (T2), Time 3 (T3) and Time 4 (T4) which have been calculated by selectively using Vernier interpolation:

path delay=$[(T2-T1)-(T3-T4)]/2$ clock offset=$[(T2-T1)+(T3-T4)]/2$ where,

T1 represents transmit time of said time stamp request message

T2 represents arrival time of said time stamp request message

T3 represents transmit time of said time stamp response message

T4 represents arrival time of said time stamp response message.

15. The system of claim 14, wherein said lower data link level of said requestor comprises a Field Programmable Gate Array which further includes embedded processors and a Peripheral Component Interface device to achieve fine time resolution and improve synchronization of parameters.

16. The system of claim 14, wherein said lower data link level of said responder comprises a Field Programmable Gate Array which further includes embedded processors and a Peripheral Component Interface device to achieve fine time resolution and improve synchronization of parameters.

17. The system of claim 14, wherein said lower data link level of said requestor comprises a Network Interface Card which is abased by a Peripheral Component Interconnect device to achieve fine time resolution and improve synchronization of parameters.

18. The system of claim 14, wherein said lower data link level of said responder comprises a Network Interface Card Network Interface Card which is abased by a Peripheral Component Interconnect device to achieve fine time resolution and improve synchronization of parameters.

* * * * *